Reissued Aug. 11, 1931 Re. 18,148

UNITED STATES PATENT OFFICE

GEORGE O. CURME, JR., OF WHITE PLAINS, NEW YORK, ASSIGNOR TO CARBIDE AND CARBON CHEMICALS CORPORATION, A CORPORATION OF NEW YORK

THERMAL DECOMPOSITION OF HYDROCARBONS

No Drawing. Original No. 1,646,349, dated October 18, 1927, Serial No. 79,896, filed January 7, 1926. Application for reissue filed May 1, 1931. Serial No. 534,438.

This invention comprises a process for thermally decomposing hydrocarbons in gaseous or vapor form.

It is well known that hydrocarbons in general are decomposed at sufficiently elevated temperatures, and that the decomposition can be so regulated that it produces hydrocarbons of smaller molecular weight than the hydrocarbons treated. Under these conditions a considerable proportions of chemically unsaturated hydrocarbons, such as the olefines, is normally present in the decomposition product.

In an extensive experience with processes involving the controlled thermal decomposition of hydrocarbons, such as the process described in Patent 1,460,545 granted on July 3, 1923, to Pierre E. Haynes and the present applicant, various materials have been investigated to determine their fitness for making tubes in which to confine hydrocarbons while heating them by products of combustion to temperatures as high as 1000° C. Because of its fairly good strength and resistance to oxidation at the temperature involved, but principally because of its cheapness, iron was the material first chosen for the part of the tubes which comes into contact with the combustion gases.

It was found, however, that iron exerts at such temperatures a powerful catalytic action on hydrocarbon vapors, promoting a reaction producing solid carbon, and the latter builds up on the walls of the tubes and soon clogs them. It was therefore necessary to line the iron tubes with copper tubing. Since no iron or copper tubing obtainable at prices permitting its industrial use for such a purpose has a sufficiently close approximation to a true cylindrical surface to permit the iron tube and its copper lining accurately to interfit, a gas layer of variable thickness was present between the two tubes and interfered seriously with the heat transfer. Furthermore the iron tubes burned out rather quickly and perforation of either the iron or the copper disabled the unit. Replacement of tubes with the attendant interference with the operation of the furnace proved to be troublesome and expensive.

In an attempt to improve the lined tubes described above, chrome-iron was substituted for iron as the material of the jacket. This alloy was found to resist corrosion very much better than iron, but a more important and entirely unexpected advantage of chrome-iron was soon discovered. It was found that when the copper lining of a chrome-iron tube became perforated and the hydrocarbon gases came into contact with the jacket, there was little or no deposition of carbon on the portion of the jacket thus exposed, and no detrimental effect on the yield of olefine hydrocarbons. Under similar conditions with iron jackets the tube would become blocked in a very short time by carbon built up on the exposed iron.

Accordingly, it was indicated that unlined chrome-iron tubes could be substituted for copper-lined iron tubes with great advantage, and the unlined tubes have gone into extensive use and are giving excellent results.

For use at the temperatures discussed above, the chrome-iron preferably contains at least 20% of chromium, but the invention is not restricted to such percentages as a smaller proportion gives a useful effect, especially at lower operating temperatures. In speaking of such lower chromium content and/or lower temperatures, it is to be understood, however, that the range contemplated particularly concerns the treatment of hydrocarbons predominantly in gaseous phase, as distinguished from such operations as liquid phase oil cracking and the like, where the occurrence of gaseous hydrocarbons is generally avoided insofar as possible. It is in the former cases, where the present invention is particularly effective to prevent the commercially excessive carbon formation during decomposition which would occur under similar operating conditions with commercial iron tubes. The best results obtained so far have been with material containing 26 to 29% chromium. The tubes are preferably composed of a workable alloy, such as is described in the patent to Becket and McQuigg, 1,454,464 dated May 8, 1923.

Seamless draw tubing is preferred but tubes fabricated from sheet by fusion welding may be used. The weld should be made with an alloy of approximately the same composition as the sheet forming the body of the tube. Even when this practice is followed a small amount of carbon may deposit on the weld when the tube is in use,—presumably because the composition of the weld is somewhat changed in the welding operation, as by oxidation of chromium. Carbon also accumulates slowly on the walls of any tube carrying heated hydrocarbon vapors in the temperature range above mentioned presumably from the baking of heavy tars formed as by-products in the cracking reaction which condense out at the temperature of operation. This carbon is readily removed by periodically passing air through the tube while heating it to a sufficient temperature to bring about oxidation of the carbon.

While the invention is especially valuable when used in connection with the production of such olefines as ethylene and propylene by subjecting hydrocarbon materials to temperatures in the vicinity of 900° C., it is applicable to many processes where the temperatures and products are quite different. The ability of chrome-iron to resist oxidation at high temperatures is known, and the invention resides in the use of the alloy in contact with hydrocarbon material under such conditions that carbon deposition would preclude the use of commercial iron. It is intended to cover all such uses of chrome-iron in the appended claims.

I claim:—

1. The process which comprises thermally decomposing hydrocarbons particularly in gaseous or vapor form while the latter are in contact with an alloy consisting predominantly of chromium and iron under such conditions that contact of commercial iron with the decomposing hydrocarbon would give rise to seriously interfering deposition of carbon.

2. The process which comprises thermally decomposing hydrocarbons while the latter are in contact with an alloy consisting predominantly of chromium and iron and containing at least 20% of chromium under such conditions that contact of commercial iron with the decomposing hydrocarbon would give rise to seriously interfering deposition of carbon.

3. The process which comprises thermally decomposing hydrocarbons by confining the same at least in part by a wall constructed of chrome-iron containing at least 20% of chromium, and applying combustion gases to said wall to heat the hydrocarbons.

4. The process of thermally decomposing hydrocarbons which comprises confining the same in a chome-iron tube resistant to oxidation at temperature as high as 900° C., and heating the exterior of the tube to about said temperature by contact of combustion gases therewith.

5. The process of making olefines which comprises subjecting hydrocarbons in gaseous form to thermal decomposition temperatures while pasing through a tube consisting predominantly of chromium and iron and containing at least 20% of chromium under such conditions that contact of commercial iron with the decomposing hydrocarbons would give rise to seriously interfering carbon formation and deposit.

6. The process of making olefines which comprises subjecting hydrocarbons in gaseous form to temperatures causing rapid thermal decomposition thereof while passing through a tube consisting predominantly of chromium and iron and having a chromium content effective to prevent the excessive carbon formation and deposition which would occur with commercial iron under the same operating conditions.

7. The process of making olefines without excessive carbon formation which comprises subjecting hydrocarbons in gaseous forms to rapid thermal decomposition at high temperatures while passing through a tube consisting predominantly of chromium and iron and containing at least 20% of chromium.

8. The process of making unsaturated hydrocarbons which comprises subjecting hydrocarbons in gaseous form to temperatures causing rapid thermal decomposition thereof while passing through a tube consisting predominantly of chromium and iron and heating the exterior of said tube by contact of combustion gases therewith, said tube having a chromium content effective to prevent the excessive carbon formation during such decomposition and also effective to resist external scaling and corrosion which would occur with commercial iron under the same operating conditions.

In testimony whereof I affix my signature.

GEORGE O. CURME, Jr.